(12) United States Patent
Beaulieu (10) Patent No.: US 10,426,103 B2
(45) Date of Patent: Oct. 1, 2019

(54) MULTILEVEL CLOSED ECOSYSTEM GREENHOUSE

(71) Applicant: GAÏA ÉCOSYSTÈMES INC., Montréal (CA)

(72) Inventor: Gaston Beaulieu, Montréal (CA)

(73) Assignee: GAÏA ÉCOSYSTÈMES INC., Montréal (CA)

(*) Notice: Subject to any disclaimer, the term of this patent is extended or adjusted under 35 U.S.C. 154(b) by 0 days.

(21) Appl. No.: 15/685,446

(22) Filed: Aug. 24, 2017

(65) Prior Publication Data

US 2017/0347537 A1    Dec. 7, 2017

Related U.S. Application Data

(63) Continuation of application No. PCT/CA2016/050180, filed on Feb. 23, 2016.

(30) Foreign Application Priority Data

Feb. 24, 2015 (CA) ..................................... 2882972

(51) Int. Cl.
*A01G 9/18* (2006.01)
*A01G 9/14* (2006.01)
*A01G 9/24* (2006.01)

(52) U.S. Cl.
CPC ................. *A01G 9/18* (2013.01); *A01G 9/14* (2013.01); *A01G 9/1407* (2013.01);
(Continued)

(58) Field of Classification Search
CPC . A01G 9/18; A01G 9/24; A01G 9/243; A01G 9/245; A01G 9/1407; A01G 9/1415; E04B 1/7612
See application file for complete search history.

(56) References Cited

U.S. PATENT DOCUMENTS 3,498,368 A * 3/1970 Conangle ............. A01G 9/1469
165/53
3,760,708 A * 9/1973 Burup ........................ A01G 9/24
454/267
(Continued)

FOREIGN PATENT DOCUMENTS

CA    1148741    6/1983
CA    2530158 A1 * 12/2004    ........... A01G 9/1415
(Continued)

*Primary Examiner* — Magdalena Topolski
*Assistant Examiner* — Morgan T Barlow
(74) *Attorney, Agent, or Firm* — Norton Rose Fulbright Canada LLP (57) ABSTRACT

A greenhouse is disclosed having a light-transmitting barrier and a floor surface. The barrier and floor surface are connected to define an enclosure within the greenhouse for plant cultivation. The barrier includes an inner layer delimiting the enclosure and an outer layer. The inner and outer layers are impermeable to air to substantially prevent air from entering the enclosure through the inner layer. The outer layer is spaced apart above the inner layer to define an air passage therebetween. The air passage is in fluid communication with at least one air inlet in a bottom portion of the outer layer and with an air outlet in a top portion of the outer layer. Air within the air passage flows passively from the at least one air inlet to the air outlet upon being heated.

16 Claims, 6 Drawing Sheets

(52) U.S. Cl.
CPC .......... *A01G 9/1415* (2013.01); *A01G 9/1438* (2013.01); *A01G 9/1469* (2013.01); *A01G 9/24* (2013.01); *A01G 9/246* (2013.01); *Y02A 40/252* (2018.01); *Y02A 40/268* (2018.01); *Y02A 40/272* (2018.01)

(56) References Cited

U.S. PATENT DOCUMENTS

| | | | |
|---|---|---|---|
| 4,012,867 A | 3/1977 | Lainchbury et al. | |
| 4,018,213 A * | 4/1977 | Mann, Jr. | A01G 9/243 126/633 |
| 4,020,989 A * | 5/1977 | Kautz | A01G 9/1469 126/616 |
| 4,089,144 A * | 5/1978 | Astl | E04B 1/18 446/110 |
| 4,159,707 A * | 7/1979 | Miquel | A01G 9/243 126/702 |
| 4,160,523 A | 7/1979 | Stevens | |
| 4,173,212 A * | 11/1979 | Whitcomb | A01G 9/243 126/620 |
| 4,195,441 A * | 4/1980 | Baldwin | A01G 9/243 47/17 |
| 4,196,544 A * | 4/1980 | Davis | A01G 7/045 47/17 |
| 4,198,953 A * | 4/1980 | Power | A01G 9/243 126/617 |
| 4,253,271 A * | 3/1981 | Raymond | A01G 9/243 47/1.4 |
| 4,265,300 A * | 5/1981 | Kurimoto | A01G 9/246 165/47 |
| 4,291,674 A * | 9/1981 | Comte | A01G 9/243 126/592 |
| 4,305,235 A | 12/1981 | Roston | |
| 4,306,542 A * | 12/1981 | Reinert | A01G 9/243 126/630 |
| 4,313,420 A * | 2/1982 | Poeschl | A01G 9/1415 126/631 |
| 4,316,405 A * | 2/1982 | Esposito | A01G 9/24 454/253 |
| 4,331,128 A * | 5/1982 | Gebhardt | A01G 9/24 126/621 |
| 4,387,533 A | 6/1983 | Green et al. | |
| 4,517,957 A * | 5/1985 | Pelley | F24J 2/23 126/625 |
| 4,556,103 A * | 12/1985 | Kuwa | A01G 9/24 165/122 |
| 4,616,696 A * | 10/1986 | Brundrett | A01G 9/24 165/54 |
| 4,622,950 A * | 11/1986 | Greenbaum | A01G 9/1415 126/618 |
| 4,658,559 A * | 4/1987 | Doherty | A01G 9/1469 52/463 |
| 4,757,803 A * | 7/1988 | Dixon | F24J 2/345 114/364 |
| 4,790,478 A * | 12/1988 | Sauvageau | A01G 9/245 237/69 |
| 4,886,084 A * | 12/1989 | Lawrence | E04H 15/18 135/124 |
| 5,423,194 A * | 6/1995 | Senecal | A47F 3/0443 62/457.6 |
| 6,594,957 B1 | 7/2003 | Milburn | |
| 7,240,458 B2 * | 7/2007 | Ishisaki | A01G 9/1415 52/2.22 |
| 7,735,502 B1 * | 6/2010 | Hotes | E04H 15/36 135/136 |
| 7,788,876 B2 | 9/2010 | Yasui | |
| 7,958,678 B2 * | 6/2011 | Ishisaki | A01G 9/1407 52/63 |
| 8,082,700 B2 * | 12/2011 | Kennedy | E04B 1/3205 135/124 |
| 8,181,661 B2 * | 5/2012 | Livacich | E04H 15/001 135/115 |
| 8,327,582 B2 | 12/2012 | Storey | |
| 8,397,505 B2 * | 3/2013 | Penciu | F03G 6/06 126/690 |
| 8,490,344 B1 * | 7/2013 | Chen | A01G 9/14 52/173.3 |
| 9,097,241 B1 | 8/2015 | Hollick et al. | |
| 2006/0264165 A1 * | 11/2006 | Van Dijk | A01G 9/1469 454/185 |
| 2007/0277451 A1 * | 12/2007 | Yasui | A01G 9/1415 52/171.3 |
| 2008/0087165 A1 * | 4/2008 | Wright | B01D 53/04 95/51 |
| 2009/0158647 A1 * | 6/2009 | Kleinwaechter | A01G 9/1438 47/17 |
| 2009/0301014 A1 * | 12/2009 | Becher | E04B 1/74 52/302.1 |
| 2009/0307973 A1 | 12/2009 | Adams et al. | |
| 2010/0126062 A1 * | 5/2010 | Houweling | A01G 9/246 47/17 |
| 2011/0005151 A1 * | 1/2011 | Krecke | F24F 5/0017 52/173.1 |
| 2011/0214364 A1 * | 9/2011 | Fuller | E04F 17/00 52/173.3 |
| 2012/0000126 A1 * | 1/2012 | Walsh, Jr. | A01G 9/243 47/60 |
| 2012/0149291 A1 * | 6/2012 | Roderick | F24F 11/0001 454/251 |
| 2013/0061897 A1 * | 3/2013 | Webster | E04H 15/008 135/126 |
| 2013/0104452 A1 | 5/2013 | Hassle | |
| 2013/0104453 A1 | 5/2013 | Hassle | |
| 2014/0054159 A1 * | 2/2014 | Bosch I Bosch | A01G 9/243 203/10 |
| 2014/0259995 A1 * | 9/2014 | White | B64G 9/00 52/173.1 |
| 2015/0321960 A1 * | 11/2015 | Kakebeeke | C04B 28/006 106/708 |
| 2016/0113214 A1 * | 4/2016 | Konin | A01G 9/243 47/17 |
| 2017/0231169 A1 * | 8/2017 | Gillard | A01G 9/1415 47/17 |
| 2017/0347537 A1 * | 12/2017 | Beaulieu | A01G 9/1415 |

FOREIGN PATENT DOCUMENTS

| | | | | |
|---|---|---|---|---|
| CA | 2853753 A1 | 5/2013 | | |
| CN | 202385556 U | 8/2012 | | |
| CN | 202435895 U | 9/2012 | | |
| CN | 103081754 A | 5/2013 | | |
| CN | 203313773 U | 12/2013 | | |
| CN | 203523435 U | 4/2014 | | |
| CN | 203640382 U | 6/2014 | | |
| CN | 103250598 B | 7/2014 | | |
| DE | 2802719 A1 * | 7/1979 | .......... A01G 9/1415 |
| DE | 2939673 A1 * | 4/1981 | .............. A01G 9/24 |
| EP | 2342968 A1 * | 7/2011 | ............ A01G 9/243 |
| FR | 71270 E * | 11/1959 | .......... A01G 9/1407 |
| FR | 72743 E * | 7/1960 | .......... A01G 9/1407 |
| FR | 2304278 A2 * | 10/1976 | ............ A01G 9/243 |
| FR | 2315844 A1 * | 1/1977 | .......... A01G 9/1415 |
| FR | 2443196 A1 * | 7/1980 | .............. A01G 9/24 |
| FR | 26110474 A1 | 8/1988 | | |
| GB | 2176590 A | 12/1986 | | |
| GB | 2516958 A | 2/2015 | | |
| NL | 9100716 A * | 11/1992 | ............ A01G 9/18 |
| NL | 1006619 C2 * | 1/1999 | .......... A01G 9/1469 |
| WO | 2007079774 A1 | 7/2007 | | |
| WO | WO-2007079774 A1 * | 7/2007 | .......... A01G 9/1415 |
| WO | 2011009960 A1 | 1/2011 | | |
| WO | WO-2011009960 A1 * | 1/2011 | .......... A01G 13/043 |
| WO | 2013066253 A1 | 5/2013 | | |
| WO | WO-2013083936 A1 * | 6/2013 | ............ A01G 9/243 |
| WO | 2015052544 A2 | 4/2015 | | |

\* cited by examiner

MULTILEVEL CLOSED ECOSYSTEM GREENHOUSE

CROSS-REFERENCE TO RELATED APPLICATIONS

This application is a continuation of PCT patent application PCT/CA2016/050180 filed on Feb. 23, 2010, which claims priority to Canadian patent application 2,882,972 filed on Feb. 24, 2015, the entire contents of both of which are incorporated by reference herein.

TECHNICAL FIELD

The application relates generally to structures for plant cultivation and, more particularly, to greenhouses.

BACKGROUND

Greenhouses typically have one or more transparent walls and roofs that allow solar radiation to penetrate into the structure for plant photosynthesis. It is difficult to control the growing conditions within a greenhouse without expending significant energy. Many greenhouses now in operation are open greenhouses. This is required because ventilation is needed on hot days to remove heat from the greenhouse.

For example, greenhouses have a tendency to accumulate large quantities of heat in their interiors when the sun is shining brightly. For certain plant species, this extra heat has to be removed to keep a favourable temperature for plant growth. This is normally done by venting the heat from within the greenhouse. In hot and humid conditions, one or more fans are used, which consumes energy, and are prone to mechanical failure. This climate control requiring that the greenhouse be open to the atmosphere reduces the ability to control the greenhouse's humidity and $CO_2$ levels, and exposes the plants to insects, bacteria or other airborne contaminants in polluted regions. Such open greenhouses also have a tendency to leak heat to the atmosphere during cool nights or during the winter season in northern-latitude regions, which inhibits plant growth.

Most greenhouses have only one level of plants, often near the ground level of the installations. This requires a relatively large footprint to install such greenhouses in order to achieve the desired production capacity. Other methods use complicated mechanisms to move plants around to better expose the plants to natural or artificial light or to minimize labour. These mechanisms are often difficult to implement and are subject to failures during the lifespan of the greenhouse.

SUMMARY

In one aspect, there is provided a greenhouse comprising: a light-transmitting barrier and a floor surface, the barrier and floor surface being connected to define an enclosure within the greenhouse for plant cultivation, the barrier comprising an inner layer delimiting the enclosure and an outer layer, the inner and outer layers being impermeable to air to substantially prevent air from entering the enclosure through the inner layer, the outer layer being spaced apart above the inner layer to define an air passage therebetween, the air passage being in fluid communication with at least one air inlet in a bottom portion of the outer layer and with an air outlet in a top portion of the outer layer, air within the air passage flowing passively from the at least one air inlet to the air outlet upon being heated.

In another aspect, there is provided a method of controlling a temperature of a greenhouse, comprising: passively circulating air between an inner and outer layer of the greenhouse when the air between the inner and outer layer is heated by the sun, the inner layer delimiting an enclosure of the greenhouse for plant cultivation, circulation of the air between the inner and outer layers cooling the enclosure, and maintaining air between the inner and outer layers when the air between the inner and outer layer is not heated by the sun, said stationary air insulating the enclosure.

In yet another aspect, there is provided a greenhouse, comprising: a double shell geometry defined by an inner light-transparent shell joined to a floor to form an air-tight lower enclosure for plant cultivation that is not connected to outside air, and an outer light-transparent shell separated from the inner shell by an air gap, both the shells being impermeable to air and defining an air passage where air is constrained between the inner and outer shells, the air passage being in fluid communication with at least one bottom air inlet at a lower portion of the outer shell and with at least one upper air outlet in a top portion of the outer shell, air within the air passage forming an upward flow from the bottom air inlet to the upper air outlet, the upward flow resulting from convection when the air within the air passage is being heated, the upward flow transporting heated air to the upper air outlet.

DESCRIPTION OF THE DRAWINGS

Reference is now made to the accompanying figures in which.

DETAILED DESCRIPTION

Figures 1A, 1B:
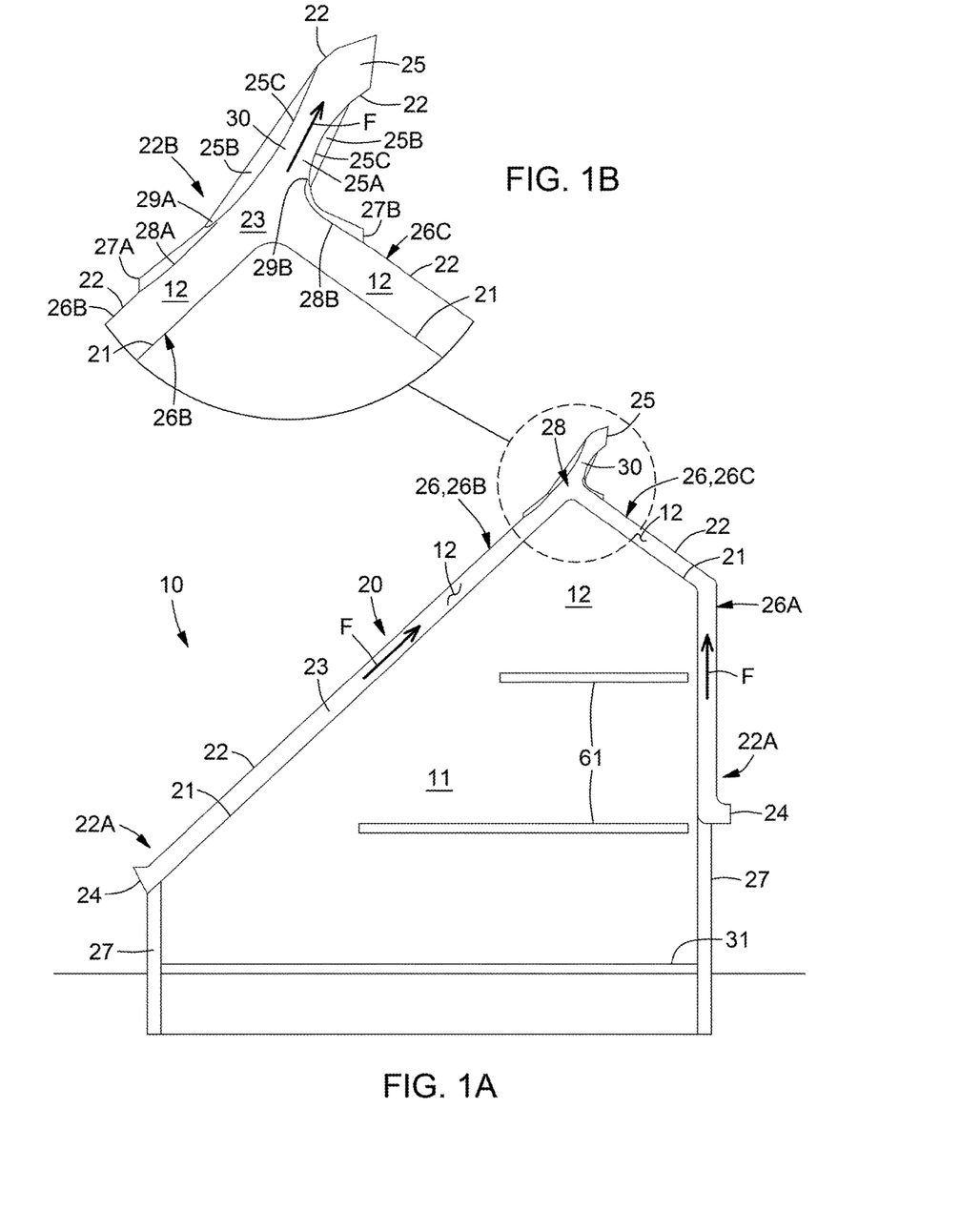
FIG. 1A is a schematic cross-sectional view of a greenhouse, according to an embodiment of the present disclosure.
FIG. 1B is an enlarged view of the circled portion of FIG. 1A.

FIGS. 1A and 1B show a multi-level greenhouse 10. The greenhouse 10 is used to promote and improve the growth of plants therein. As will be explained in greater detail below, the greenhouse 10 allows for plant placement at different vertical intervals within the greenhouse 10. The greenhouse 10 disclosed herein is also a "closed" greenhouse 10 in that it has an enclosure 11 which is not directly exposed to the air outside the greenhouse 10. Such a closed greenhouse 10 therefore does not lose or receive moisture, heat, pests, and/or $CO_2$ from or to the surrounding air, and is thus better able to control the conditions within the enclosure 11 for plant cultivation, where such plant cultivation can be monoculture or polyculture. The closed enclosure 11 where the plants are cultivated is a controlled atmosphere and is filed with air 12.

The greenhouse 10 has a light-transmitting barrier 20 and a floor surface 30 which cooperate together and/or are connected, directly or indirectly, to define the inner enclosure 11 of the greenhouse 10. The floor surface 30 can be a base or floor which is purpose-built for the greenhouse 10 and its application. Alternatively, the floor surface 30 can be any surface upon which the greenhouse 10 rests.

The light-transmitting barrier 20 (or simply "barrier 20") defines at least a portion of the exterior of the greenhouse. While air can be pumped or otherwise provided into the enclosure 12 if so desired, the barrier 20 forms a structure which prevents the air surrounding the greenhouse 10 from penetrating into the enclosure 11, via the barrier 20. The barrier 20 therefore provides the greenhouse 10 with the "closed" characteristics described above. The term "light-transmitting" refers to the ability of the barrier 20 to allow wavelengths of light favourable to plant cultivation (e.g. such as from solar radiation) to penetrate through the barrier 20 and into the enclosure 11.

The barrier 20 can form any part of the exterior, or shell, of the greenhouse 10, and is largely determinative of the shape of the greenhouse 10. For example, in the embodiment shown, the greenhouse 10 has a hut or house-like shape which is defined by roof and wall sections of the barrier 20. As will be discussed below, the greenhouse 10 can take any other shape as well, provided that solar (or other) radiation can penetrate into the greenhouse 10. The greenhouse 10 of the present embodiment therefore can vary in dimension from a relatively small rectangular footprint to a much larger footprint, with any length of the hut or house-like shape. The embodiment of FIG. 1A shows a relatively narrow greenhouse having enough space to install two mezzanine floors 61. Similarly, by increasing (or scaling up) the width of the enclosure 11, the height will proportionally increase and allow installing any number of additional floors 61 or mezzanines for plant cultivation in earth bins or vertical towers, as discussed below. For example, the greenhouse 10 can have its back wall adjacent to an existing or new building having many storeys in height and correspondingly, the closed greenhouse 10 would have many storeys available for plant cultivation. The larger the greenhouse 10, the more efficient is the passive natural convection flow circulating air within the greenhouse 10, as described in greater detail below.

The barrier 20 includes an inner layer 21 and an outer layer 22 which are both impermeable to air. The inner layer 21 deliminates, and defines the extent of, the enclosure 11 for plant cultivation. The outer layer 22 is exposed to the air surrounding the greenhouse 10. The inner and outer layers 21,22 can be made of any suitable material or medium for transmitting light therethrough, and for substantially preventing the passage of outside air into the enclosure 11. Such materials can be hard or flexible. They include, but are not limited to, polycarbonate films or panels. They can include a film made from ethylene tetrafluoroethylene (PTFE). They can also include poly(methyl methacrylates) (PMMAs), commonly referred to as acrylic or acrylic glass. Common trade names for such materials include Plexiglas™ and Acrylite™. The inner and outer layers 21,22 can be made of separate acrylic materials. For example, the outer layer 22 can be made of Acrylite™ ALLTOP Clear and have a thickness of about 16 mm, while the inner layer 21 can be made of Acrylite™ HeatStop Cool blue and have a thickness of about 8 mm.

The outer layer 22 is spaced apart from, and above, the inner layer 21 along the length of each layer 21,22. This configuration of the inner and outer layers 21,22 defines a volume in which air can accumulate and circulate, which is referred to herein as an air passage 23. Given the impermeable nature of each layer 21,22 to air, the air 12 within the air passage 23 is confined to the extent of the air passage 23, and is prevented from entering the enclosure 11 via the inner layer 21. The inner and outer layers 21,22 therefore provide a "double shell" configuration. It can thus be appreciated that the "double shell" configuration of the barrier 20 can prevent hot air from entering the enclosure 11 of the greenhouse 10 on sunny days, while also providing a place for substantially stagnant air to accumulate and thus insulate the enclosure 11 on less sunny or colder days. The double shell configuration therefore helps to both cool the enclosure 11, and to reduce heat loss therefrom.

Still referring to FIGS. 1A and 1B, the air passage 23 extends between the overlapping inner and outer layers 21,22. The air passage 23 is in fluid communication with one or more air inlets 24 which are located toward the bottom of the barrier 20, and with one or more air outlets 25 which are located toward the top of the barrier 20. The air inlet and outlets 24,25 are vents, holes, or other apertures in the outer layer 22 of the barrier 20. They allow the outside air to enter the air passage 23, and to be conveyed from the air passage 23 out of the greenhouse 10. Each air inlet 24 is located at a bottom portion 22A of the outer layer 22. In the embodiment shown, the bottom portion 22A is located toward the floor surface 30 but vertically-spaced therefrom. Similarly, each air outlet 25 is located at a top portion 22B of the outer layer 22, which in the embodiment shown, is an uppermost portion of the outer layer 22. Other configurations for the bottom and top portions 22A,22B of the outer layer 22 are within the scope of the present disclosure. One or more of the air inlets 24 and outlets 25 can be provided with louvered doors to protect against the ingress of debris, rain, or snow into the air passage 23, and/or with gutters to collect rain and snow run-off from the outer layer 22. Furthermore, the louvered doors can be open to allow free flow of air for cooling purpose or closed to keep the air 12 in the air passage 23 stagnant for insulating purpose.

The double-shell configuration of the inner and outer layers 21,22 allow for the passive cooling and insulating of the enclosure 11 of the greenhouse 10. The term "passive" refers to the ability of the inner and outer layers 21,22 to block and/or limit heat from entering the enclosure 11 or to dissipate excess heat which has accumulated within the enclosure 11 as a result of solar radiation, and to help preserve heat within the enclosure 11 when the outside environment is colder, without using mechanical systems (i.e. fans, pumps, heaters, etc.).

The passive cooling configuration is typically in effect on hot, sunny days when there is a need to cool the enclosure 11 by reducing heat penetration into the enclosure 11, or by removing heat therefrom. The air 12 confined to the air passage 23 is warmed by solar or other thermal radiation, and/or by conduction, often to a temperature that is greater than that of the air outside the greenhouse 10. The density of the warmed air 12 is reduced in the air passage 23 and an upward natural convection flow is created. Because the warm air 12 is confined to the air passage 23, its tendency to rise is constrained, and the air 12 is thus directed by the inner and outer layers 21,22 to the air outlet 25. This movement of the warm air 12 creates an upward airflow along flow direction F, principally caused by the reduced density of the warm air inside the air passage 23 compared to the relatively higher density of the colder air outside the greenhouse 10. The lower density air then naturally rises within the air passage 23 thereby causing an upward flow between the air inlets 24 and the air outlets 25. This circulation of the air 12 transports heat to the one or more outlets 25 and also draws heat from the enclosure 11 via heat conduction and radiation through inner layer 21, thereby helping to cool the enclosure 11. The closed enclosure 11 of the greenhouse 10 therefore remains cooler, even if no ventilation to the outside air is allowed from the enclosure 11.

The passive insulating configuration is typically in effect on cold and/or less sunny days, when there is a need to preserve heat within the enclosure 11. The air 12 confined to the air passage 23 is roughly the same temperature as the air outside the greenhouse 10, when the sun is not shining. There is therefore little circulation of the air 12 due to convection between the air inlets 24 and the air outlet 25. In addition, louvered doors can be installed to partially or fully close the air inlets 24 to prevent airflow and capture the air 12 between the double shell structure of the inner passage 23, for insulation purposes. The air 12 within the air passage 23 therefore remains substantially stationary or stagnant. Given the relatively strong insulating properties of air, the air 12 within the air passage 23 thus forms an insulating layer around the enclosure 11, which limits and/or prevents heat leakage therefrom. It can thus be appreciated that the double-shell structure of the barrier 20 reduces and/or prevents heat from leaving the enclosure 11 during nights or on cold days. Therefore, the combined effect of the double-shell configuration of inner and outer layers 21,22 and an air layer within the air passage 23 provide resistance to heat dissipation, and help to keep the inner enclosure 11 at a desired temperature, even without a supplementary heating system.

It can thus be appreciated that the structure of the greenhouse 10 helps to achieve passive, sun-driven, cooling and insulating of the plant-cultivation area 11. The greenhouse 10 therefore has improved energy efficiency because it consumes less energy than conventional greenhouses which typically employ mechanical cooling and/or heating systems. The cooling and heating energy loads of the greenhouse 10 are therefore minimized with passive, solar-driven techniques that are part of the static configuration and geometry of the greenhouse 10 containing the closed enclosure 11.

It will also be appreciated that the cooling and insulating effects caused by the structure of the barrier 20 may be amplified by increasing the volume of the air passage 23. The larger the volume of the air passage 23, the more warm air 12 may be moved towards the air outlet 25, and the more stagnant air 12 is available to insulate the enclosure 11. If desired, the size of the air passage 23 between the two transparent layers 21,22 can be scaled up proportionally to the overall size or air volume of the enclosure 11 that needs to be controlled in temperature. For example, for relatively small greenhouses 10, such as the one shown in FIG. 1A, the size of the air passage 23 may start at 20 centimeters and can be as much as 3 meters for relatively large multilevel greenhouses 10 of ten storeys or more. It can thus be appreciated that the size of the air passage 23 between the two transparent and air-tight layers 21,22 contributes to the efficiency of the natural convection cooling effect. In addition, the greenhouse 10 can have devices to vary the mass flow of air 12 in the air passage 23, such as variable louvered doors that can be adjusted to vary the flow of air 12 through the air inlets 24 in order to achieve an optimal cooling effect depending on the sun radiation level, the outside temperature, and the desired targeted temperature inside the lower enclosure 11, among other factors.

Features of the various embodiments of the greenhouse 10 will now be described in greater detail.

In the embodiment of FIGS. 1A and 1B, the barrier 20 includes one or more light-transmitting roof sections 26 supported by one or more light-transmitting wall sections 26A. The barrier 20 has a first roof section 26B and a second roof section 26C, both of which are inclined relative to the floor surface 30. More particularly, the first roof section 26B faces to the south, and is inclined at an angle of about 45 degrees relative to the floor surface 30 in order to maximise penetration of the sun's rays. The second roof section 26C is also inclined at an angle of about 45 degrees to the floor surface 30, but is shorter than the first roof section 26B because it faces to the north and thus receives less exposure to the sun. The wall section 26A is angled about 90 degrees to the floor surface 30. The wall section 26A is designed to maximise the volume of the enclosure 11 for a certain greenhouse 10 footprint or ground usage. Diffuse natural light penetrates the wall section 26A. Light-opaque walls 27 can provide structural support to the barrier 20, as well as insulation.

Referring to FIG. 1B, the air outlet 25 of the outer layer 22 is disposed within an apex section 28. The air outlet 25 includes an outlet passage 25A which is defined by spaced apart outer layers 22 of the first and second roof sections 26B,26C. The outlet passage 25A includes one or more aerofoil-shaped structures 25B disposed therein. The surfaces 25C of the structures 25B contribute to laminar flow occurring inside the outlet passage 25A. The aerofoil-shaped surfaces 25C facilitate the flow of air 12 from the outlet passage 25A, particularly when compared to it the outlet passage 25A were a straight wall because turbulent flow would be present and a choking effect might occur, substantially reducing the airflow to the outlet 25 and subsequently the cooling effect of the airflow. The surfaces 25C also reduce the cross-sectional area of the outlet passage 25A. This creates a Bernoulli effect on the airflow, reducing its pressure as it accelerates between the two aerofoil-shaped structures 25B. It can therefore be appreciated that this "double aerofoil structure" may act as an air pump since the pressure at the throat of the air outlet passage 25A is lower than that at the air inlets 24. Since air flows from high to low pressure, an increased in the cooling airflow is present, as compared to natural convection flow alone.

Still referring to FIG. 1B, the outlet passage 25A may contribute to further increasing the speed of the cooling airflow with the help of the COANDA effect, which is the ability of the flow to remain attached to convex surfaces (such as the surfaces 25C). This embodiment implements the COANDA effect in the following manner: two additional air feed conduits or inlets 27A and 27B are located on top of outer layer 22. Connected to the two air inlets 27A,27B are the curved surfaces 28A,28B which are a set of inlet guide vanes (IGV) directing the airflow from the air inlets 27A, 27B to thin gaps 29A, 29B just below the aerofoil surfaces 25C. This geometry helps to provide a secondary airflow into the secondary air inlets 27A,27B, this secondary airflow being provided naturally by the wind (when it is strong enough) or by a pressurize air pipe with a slot directed into the air inlets 27A, 27B. This secondary airflow is conveyed into the thin gaps 29A,29B at a relatively large airspeed. This relatively high-speed flow (compared to the speed of natural convection flow) sticks to the aerofoil surfaces 25C due to the COANDA effect. This high speed flow contributes to pulling the air into the outlet passage 25A, and may increase the net airflow at the outlet throat 31 when compared to airspeeds caused only by the natural convection flow created by the sun heating the air between the double-shell barrier 20. It can be appreciated that this high speed flow, resulting from the addition of natural convection flow created by the sun heat between the shells, the Bernoulli effect creating a pressure reduction at the throat of the double-aerofoil outlet structure and finally the multiplier effect created by the COANDA flow, contributes to maintaining a cool environment in the lower enclosure 11 used for growing plants. In addition, as explained latter, this embodiment allows the production of electricity by this geometrically optimized structure.

Figures 2A, 2B:
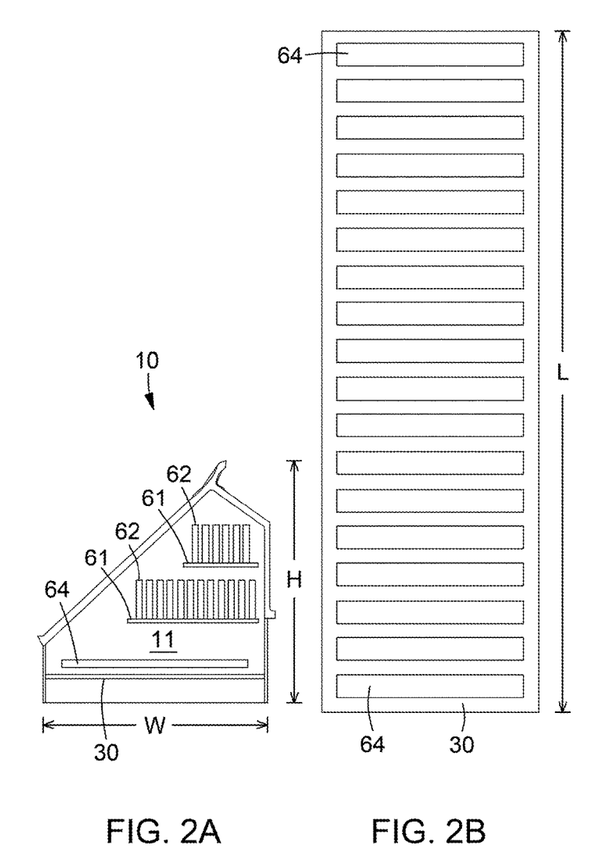
FIG. 2A is a schematic cross-sectional view of the greenhouse FIG. 1A shown with a bottom floor surface installed with cultivation bins and with multi-level platforms installed with cultivation towers.
FIG. 2B is a top view of the floor surface and the cultivation bins of FIG. 2A.
Figure 2C:
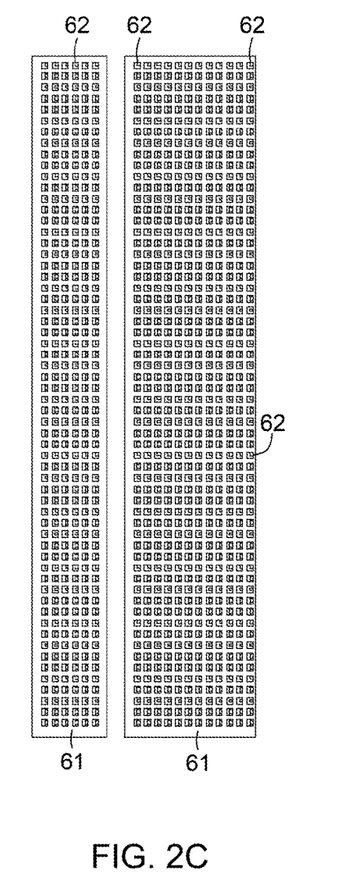
FIG. 2C is a top view of the platforms and cultivation towers of FIG. 2A.

Referring to FIGS. 2A to 2C, the multilevel greenhouse 10 may have a geopolymer concrete floor surface 30 and a plurality of platforms 61. The platforms 61 are substantially horizontal surfaces supporting the weight of plants being placed thereon for cultivation. The platforms 61 are spaced apart vertically from one another, and from the floor surface 30 within the enclosure 11, thus allowing for cultivating plants in "three dimensions". Stated differently, the presence of the plurality of platforms 61 at different vertical positions within the enclosure 11 increases the production capacity of the greenhouse 10 when compared to conventional greenhouses where plants are normally grown on only one level. The ground floor surface 30 may be provided with a plurality of bins 64 containing earth, or substrate for plants roots, to allow cultivating a large variety of root-based vegetables or any type of plants. The plurality of bins 64 are shown raised above the floor surface 30 so that the top level of the bins 64 is at waste-height to facilitate plant cultivation without having to bend down. The width on bins 64 is adjusted, for example, to 1.2 m wide so that plants are reachable by hand from any of the sides. Various devices can be placed on the platforms 61 to facilitate plant cultivation. In the embodiment shown, a plurality of upright cultivation towers 62 is disposed within the enclosure to further increase the number of plants in the enclosure 11 by growing upward in "three dimensions". Furthermore, the platforms 61 can be optionally constructed of a transparent reinforced glass material (or any other transparent material) to allow more sunlight penetration into the enclosure 11. As the width W of the greenhouse 10 is increased, its height H can also be increase allowing additional platforms 61 to be installed. In such a configuration, the width of each platform 61 may also proportionally increase. The length L of the greenhouse can be of any size.

Figure 3:
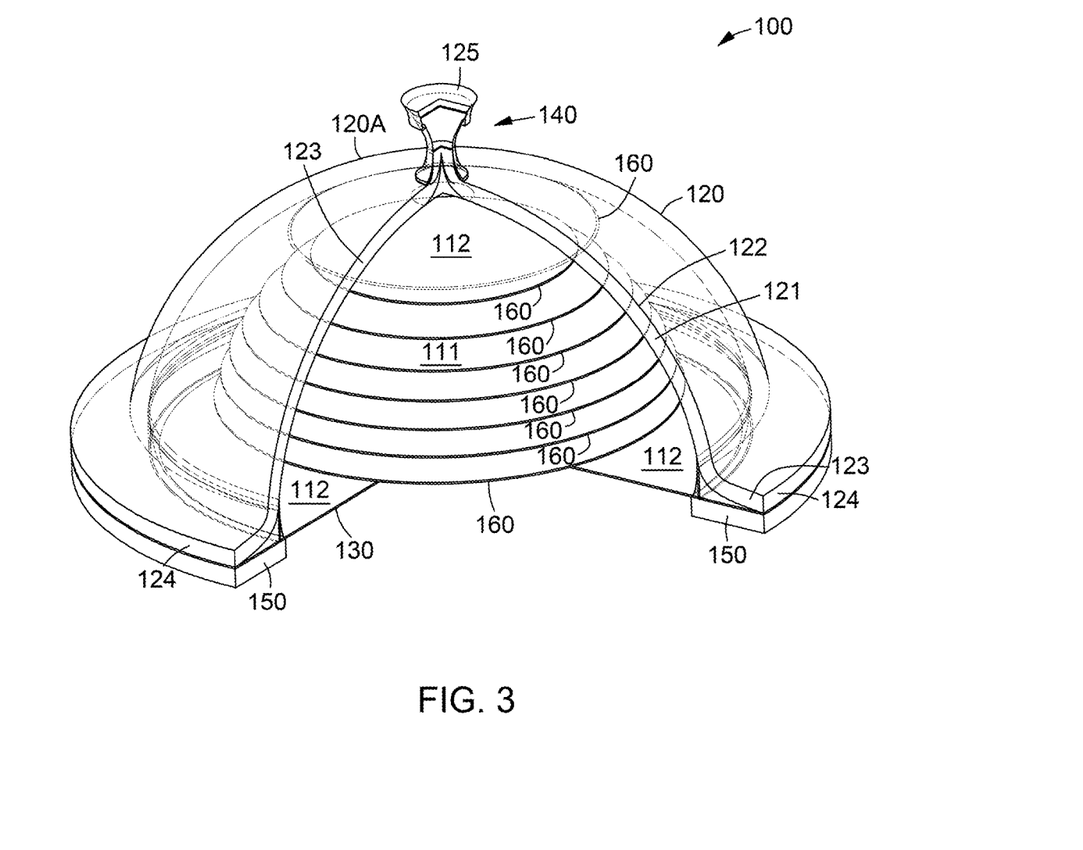
FIG. 3 is a perspective view of a greenhouse, according to yet another embodiment of the present disclosure, being shown partially sectioned.

Referring to FIG. 3, the greenhouse 100 has a light-transmitting barrier 120 which forms a dome 120A. The dome 120A is a rounded structure that extends from the floor surface 130. The air inlet 124 in this embodiment includes an annular opening disposed at a bottom of the dome 120A and covering its full circumference. FIG. 3 is a different embodiment, in a dome shaped structure, of the passive, sun-driven mechanisms explained above. The dome 120A allows the construction of much larger multilevel greenhouses 100 in a stand-alone capacity. It can be appreciated that the building shape does not necessarily need to be a dome, but can be of any geometry, such as a cone, truncated cone, pyramid and so on. This embodiment allows large, industrial scale, multilevel greenhouses 100 to be built directly in towns or in periphery of towns without the need of large ground surface footprints as would be required by conventional greenhouses having the same production capacity.

The dome shaped building of FIG. 3 has inner and outer layers 121, 122 therefore providing the "double shell" configuration or geometry discussed above. It can thus be appreciated that the "double shell" geometry of the barrier 120 can prevent hot air from entering the enclosure 111 of the greenhouse 100 on sunny days and cools it down by natural convection flow between the two transparent shells 121, 122, while also providing a place for substantially stagnant air to accumulate and thus insulate the enclosure 111 on less sunny or colder days. The double shell configuration therefore helps to both cool the enclosure 111 and to reduce heat loss therefrom. As explained before, it will also be appreciated that the cooling and insulating effects caused by the structure of the barrier 120 may be amplified by increasing the volume of the air passage 123. The "double dome" structure of FIG. 3 can have an air gap of many meters in thickness given the large volume of the enclosure 111.

Figure 4:
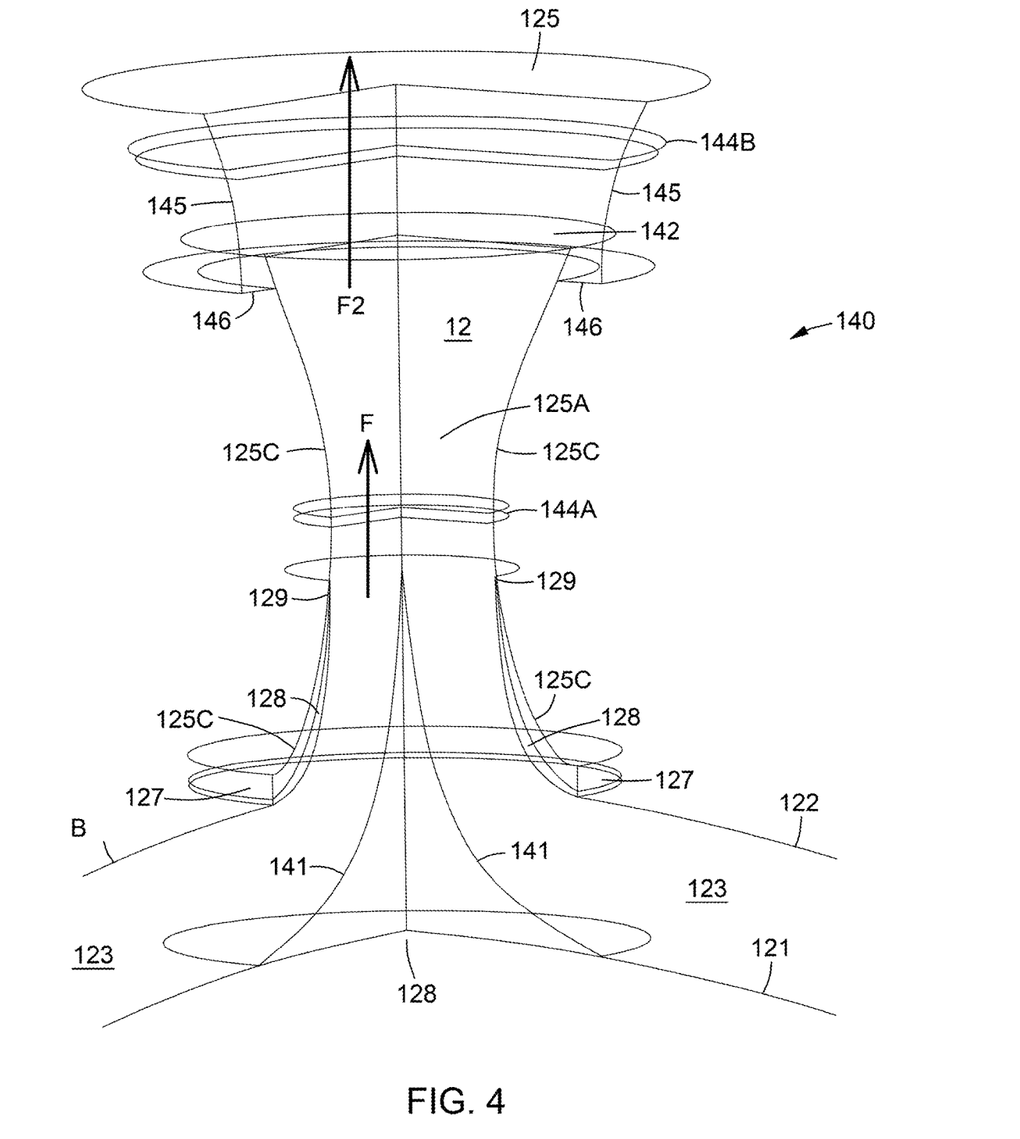
FIG. 4 is an enlarged view of the top portion of FIG. 3.

The greenhouse 100 of FIG. 3 has an outlet tower 140, an example of which is shown in FIG. 4. The outlet tower 140 is mounted about the apex of the dome 120A. The outlet 125 is in fluid communication with the circumferential annular inlet 124 located at the base of the dome via the air passage 123 between the inner 121 and outer 122 transparent layers. A flow guide body, shown in FIG. 4 as a circumferential, conic shaped structure 141, installed on top of the inner layer 121, directs the airflow coming from the air passage 123 into the outlet passage 125A. The hourglass shape of the outlet tower 140 provides an aerofoil surface 125C that reduces and/or prevents turbulent flow from occurring, thus preventing choking of the flow. The cylindrical aerofoil surface 125C creates a reduction in the area of the outlet passage 125A. This creates a Bernoulli effect on the airflow, reducing its pressure as it accelerates inside the aerofoil-shaped outlet passage 125A. It can therefore be appreciated that this aerofoil configuration acts as an air pump since the pressure at the throat of the outlet passage 125A is lower than that at the bottom air inlet 124. Since air flows from high to low pressure, an increase in the passive cooling airflow may be produced, as compared to natural convection flow alone.

Referring to FIG. 4, the outlet tower 140 is configured to further increase the speed of the cooling airflow with the help of the COANDA effect as described above. The implementation of the COANDA effect is achieved by a secondary annular air inlet 127 which feeds air into the cylindrical channel created by an annular inlet guide vane (IGV) 128. The air 12 is accelerated through a thin annular gap 129 and the airflow then sticks to the aerofoil surface 125C due to the COANDA effect. Due to air viscosity and the reduced pressure created by the airflow over the aerofoil surface 125C, the airflow speed in the outlet passage 125A, where the flow F is occurring, is significantly increased when compared to the speed of the natural convection flow created by the sun heating the air between the double-shell barrier 120. It can be appreciated that this relatively high speed flow, resulting from the addition of natural convection, Bernoulli effect, and the COANDA flow, contributes to maintaining a cool environment in the lower enclosure 111 used for growing plants.

As described above, electricity may be generated in this optimized structure. A first wind turbine 144A is installed at the throat, for example, of the outlet passage 125A where the maximum airflow F velocity is occurring. The airflow kinetic energy is therefore transformed into electricity by the wind turbine 144A.

An annular airflow diffuser 145 can also be installed on top of the outlet tower 140. The airflow F2, exiting the tower top 142 creates a suction effect inside the diffuser 145 that helps to draw in additional air from the outside via a diffuser annular inlet 146. This increases the mass flow of air F2 circulating into the diffuser 145. At that point, the airflow F2 velocity is slower than that of airflow F in the outlet channel 125A. However, the much larger area of the diffuser 145 can receive a second wind turbine 144B at the throat of the diffuser 145. Positioning a diffuser 145 on top of outlet tower 140 can increase the electrical power produced by this outlet tower 140 structure. It is also possible to operate the greenhouse 100 without the diffuser 145 and wind turbine 144B installed, and only with the outlet tower 140 producing electricity with wind turbine 144A Another device that can be positioned in the outlet tower 140 is a heat exchanger. The heat exchanger can be in fluid communication with the air 12 exiting the greenhouse 100. During operation of the heat exchanger, the heat from the warm air 12 received from the air passage 123 is transferred to a primary fluid in the heat exchanger, thereby heating the primary fluid. The heated primary fluid can be used for various purposes. For example, where the primary fluid is a liquid such as liquid water, the heated liquid can be transported by a piping network to an insulated water reservoir underneath the floor surface 130, where a water-to-water heat exchanger transfers heat to the water reservoir for later use. The heat can also be transferred directly to an annular sand bed 150 (see FIG. 3), located just below the air inlet 124. The heated liquid in the pipes can directly heat the sand bed 150 where a plurality of pipes is installed. The sand bed 150 will then transfer the heat to the air passage 123 above the sand bed. The sand bed 150 thus forms a heat sink, which is an energy transformation device which takes the waste heat from the air 12 (or any industrial process rejecting heat), and contributes to the convective airflow between the two layers 121,122. The waste heat harvested in this way can be reused during colder nights, or when the sun is insufficient to keep a sufficiently warm temperature in the enclosure 111.

The main floor surface 130, of the greenhouse 100, can be part of a geopolymer concrete base. Such a geopolymer base can increase the durability of the floor surface 130 and/or the structure supporting the greenhouse 100. Geopolymer concrete has improved characteristics compared to generally used Portland concrete because it is impermeable to water and deteriorates relatively little with time. Even when exposed to a high humidity environment like a greenhouse, the geopolymer concrete will resist deterioration. The manufacturing of geopolymer cement, used to produce geopolymer concrete, generates much less $CO_2$ than for conventional Portland cement. This contributes to the LEED certification of the greenhouse 100.

Figure 5:
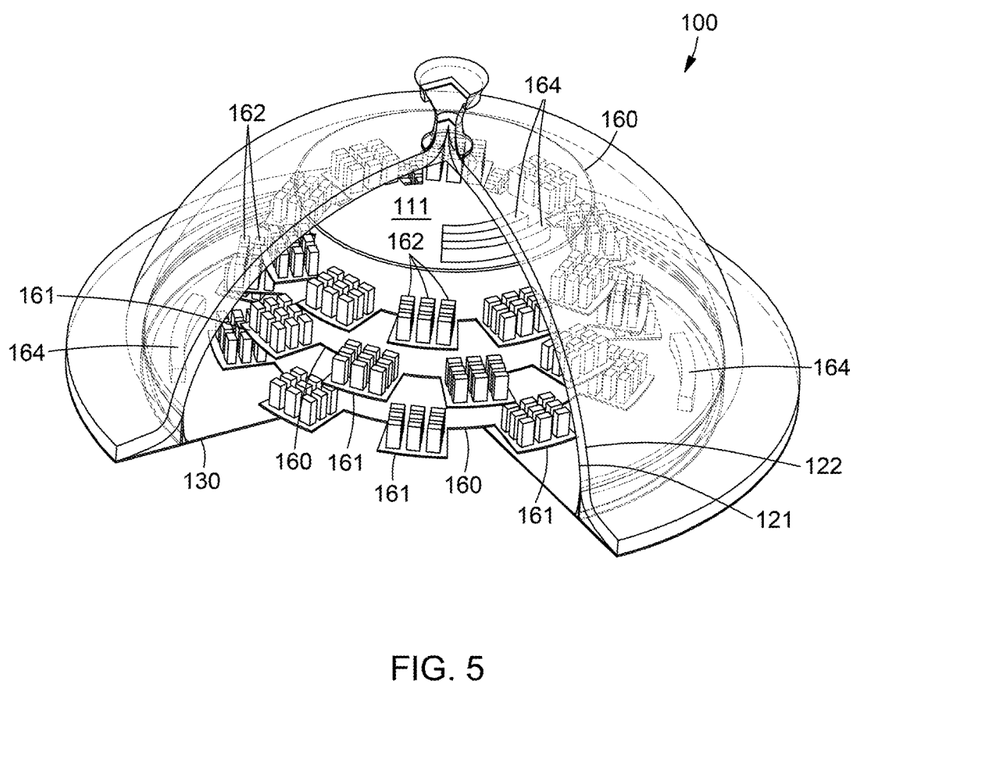
FIG. 5 is a perspective view of the greenhouse of FIG. 3 shown with multi-level floors installed with cultivation bins and cultivation towers.

As shown in FIG. 5, the multilevel greenhouse 100 may also include a plurality of geopolymer concrete floors 160, depending on the overall height of the building. These are substantially horizontal surfaces support the weight of plants being placed thereon for cultivation. The geopolymer concrete floors 160 are spaced apart vertically from one another, and from the floor surface 130 within the enclosure 111, thus allowing for cultivating plants in "three dimensions". Stated differently, the presence of the plurality of floors 160 at different vertical positions within the enclosure 111 increases the production capacity of the greenhouse 100 when compared to conventional greenhouses where plants are normally grown on only one level. Each floor 160 may be provided with a plurality of bins 164 containing earth, or substrate for plants roots, to allow cultivating a large variety of root-based vegetables or any type of plants. For example, cultivation bins 164 positioned lower down in the enclosure 111 can be used to cultivate root vegetables, while those near the top of the enclosure 111 can be used to cultivate tropical fruits and vegetables. The plurality of bins 164 are shown raised above the floor surface 130 or above the floors 160 so that the top level of the bins 164 is at waste-height to facilitate plant cultivation without having to bend down. The width on bins 164 is adjusted to 1.2 m wide, for example, so plants are reachable by hand from any of the sides. A tropical zone, defined above the uppermost floor 160, is a secondary enclosed air volume because the top floor 160 touches, and is sealed by the inner layer 121 along its periphery, thus allowing a different or higher air temperature in that zone for tropical plant cultivation.

Referring to FIG. 5, a plurality of platforms 161 are attached to the outside periphery of each floor 160. As shown in FIG. 5, the platforms 161 are planar bodies that extend radially outward towards the inner transparent layer 121 and are angularly spaced apart along the outside circumference of the floors 160. For each vertically adjacent floor 160, the platforms 161 are out of phase, or angularly offset. In the embodiment shown, the platforms 161 are angularly spaced apart by about forty degrees, and are also angularly offset or out of phase with vertically adjacent platforms 161 by about forty degrees. This allows light to penetrate into the lower levels of the enclosure 111.

Various devices can be placed on the platforms 161 to facilitate plant cultivation. In the embodiment shown, a plurality of upright cultivation towers 162 is disposed within the enclosure 111. A plurality of cultivation towers 162 is supported by each platform 161. Taller towers 162, being 2 m in height for example, can be positioned on lower level floors 160 and can rise to just below the inner layer 121, while shorter towers 162, having 1.2 m in height for example, can be positioned on higher level floors 160 and can also rise to just below the inner layer 121. Furthermore, the platforms 161 can be optionally constructed of a transparent reinforced glass material (or any other transparent material) to allow more sunlight penetration into the enclosure 111.

It can thus be appreciated that the greenhouses 10,100 disclosed herein are multilevel greenhouses 10,100, of any desired size or shape, which allow passive solar cooling and heating/insulation for a closed ecosystem greenhouse 10,100. Furthermore, FIG. 3 showing a total of ten floors 160 and FIG. 5 showing a total of five floors 160, are only illustrative and the number of floors 160 is not limited, the only limitation being the structural integrity of the overall greenhouse 10,100 when exposed to gravity loads and wind loads. The greenhouse 10,100 can therefore be a vertically-integrated, industrial scale, multilevel closed ecosystem greenhouse 10,100. Such a greenhouse 10,100 reduces the amount of energy needed to cool and heat compared to conventional greenhouses, and reduces the presence of relatively heavy mechanical systems. The full volume of the enclosures 11,111 of the greenhouses 10,100 can thus be used for plant cultivation, thereby providing a "three-dimensional" greenhouse 10,100.

The arrangement of inside floors 160 and platforms 161 lets the air mass inside the enclosure 111 be free to move. This arrangement is designed to allow a natural air draft helping to transport humidity and $CO_2$ throughout the greenhouse enclosure 111 and creating a natural ecosystem that slowly blows against the plants' leaves like a low wind breeze. This helps prevent the formation of fungus because humidity in contact with the plants' leaves is transported and moved around. This also lowers the need for energy to drive fans to create ventilation inside the enclosure 11,111, as is normally done in conventional greenhouses. In addition, a high concentration of $CO_2$ can be present in the enclosed air 112 and comes in contact with the leaves and fruits favouring photosynthesis and faster growth of the plants.

The greenhouse 10,100 disclosed herein therefore can thus avoid using mechanical devices that require a significant construction and installation cost, and which can fail due to their moving parts during the service life of the devices. The greenhouse 10,100 also reduces the physical complexity of designs because of the minimisation of moving parts in the structure. Once the internal geometrical floor configuration is constructed, it can be used as support to assemble the double transparent layers. It can thus be appreciated that the greenhouse 10,100 double shell barrier 20,120 can be made to be relatively lightweight, thereby avoiding the need for costly reinforcement of roof structures that are required to carry the weight of conventional steel greenhouses. This increases the versatility of the greenhouse 10,100.

The closed volume of the enclosure 11,111 also helps to reduce water consumption compared to conventional greenhouses that are open to the surrounding air. This allows water evaporating from the plants being cultivated to be condensed and re-used in the greenhouse 10,100. This allows the installation of greenhouses 10,110 in arid regions because they can operate with limited amount of water. Cultivation productivity can also be increased in this closed environment because the concentration of $CO_2$ can be controlled, and indeed, increased in the closed environment of the enclosure 11,111 because no $CO_2$ is lost through ventilation to outside air. The closed environment also prevents undesirable insects or airborne pollutants from entering the closed ecosystem enclosure 11,111.

Figure 6:
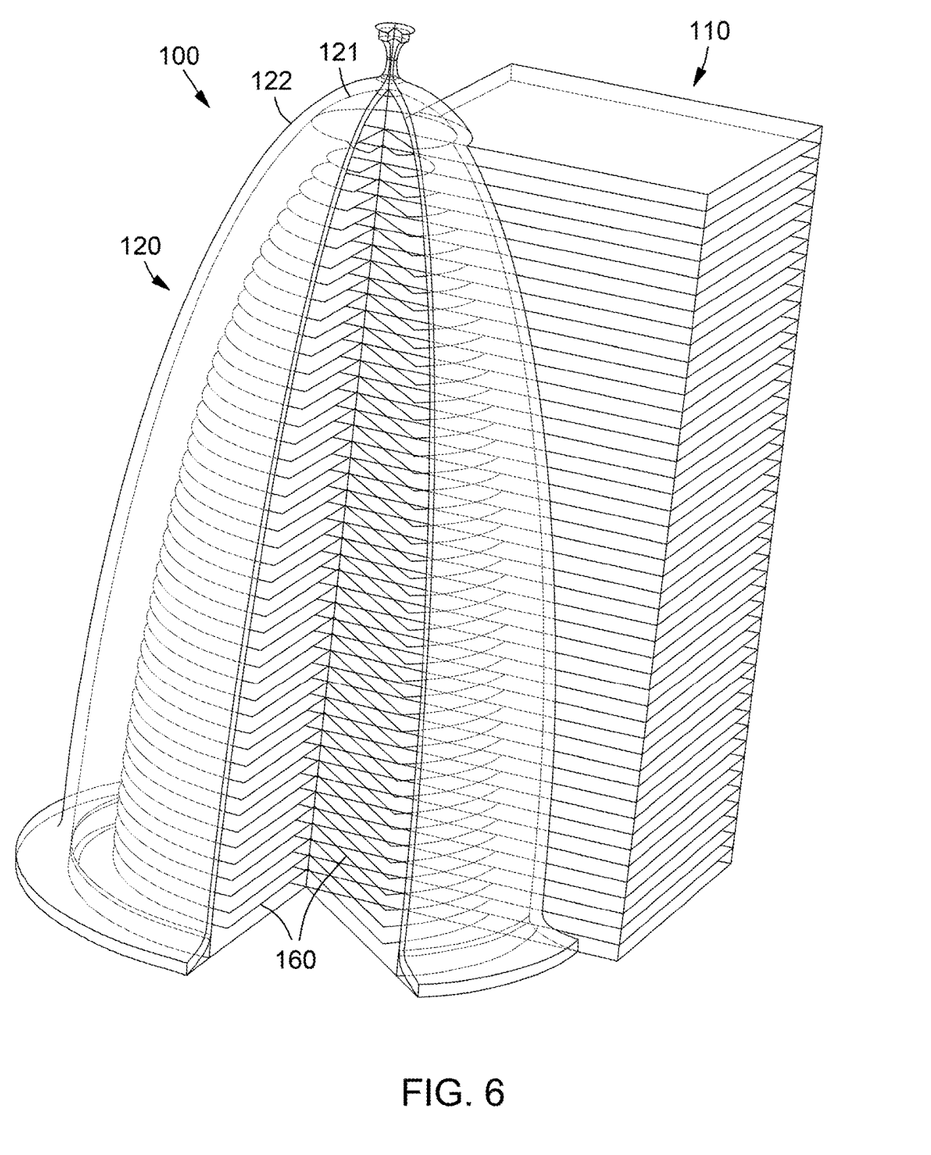
FIG. 6 is a schematic cross-sectional view of a greenhouse, according to an embodiment of the present disclosure, shown adjacent a building.

Referring to FIG. 6, the greenhouse 10,100 disclosed herein can also be used for large buildings, like skyscraper apartments or office buildings 110. The embodiment of FIG. 6 is an example of a building having fifty storeys and being located at a 45 degree angle, on the north side of the greenhouse 100. This allows solar radiation to be captured by the greenhouse 100, which here has a plurality of floors 160. The number of floors 160 is not limited to the configuration shown. These large buildings, or a part thereof, can be located inside (or adjacent on one side) of the double shell barrier 20,120. In such a configuration, the greenhouse 10,100 and office or apartment buildings would both benefit from solar passive air conditioning, electricity production, and enhanced biophilia. The embodiment of this combined structure for living space and plant cultivation would thus create a favourable living space in an urban environment.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A greenhouse comprising:
a light-transmitting barrier; and
a floor surface;
the barrier and the floor surface defining an enclosure within the greenhouse for plant cultivation, the barrier comprising an inner layer delimiting the enclosure and an outer layer, the inner and outer layers being impermeable to air to prevent air from entering the enclosure through the inner layer, a shape of the outer layer being the same as a shape of the inner layer, the outer layer being spaced apart above the inner layer to define an air passage therebetween, the air passage being in fluid communication with at least one air inlet in a bottom portion of the outer layer and with an air outlet, the air passage being unobstructed between the at least one air inlet and the air outlet to allow air within the air passage to flow passively from the at least one air inlet to the air outlet upon being heated; and
an outlet tower mounted to a top portion of the outer layer and extending upwardly from an opening in an apex of the barrier to an outlet passage, the outlet tower having an hourglass shape and curved airfoil surface, and an inlet guide vane spaced inwardly from the curved airfoil surface to define a gap therebetween, the gap being in fluid communication with a secondary air inlet to provide air into the gap.

2. The greenhouse of claim 1, wherein the light-transmitting barrier forms a dome extending from the floor surface, the at least one air inlet including an annular opening disposed at a bottom of the dome, and the opening in the apex of the dome being round.

3. The greenhouse of claim 2, further comprising a circumferential flow guide body extending upward from the inner layer through the opening in the apex of the dome and into the outlet tower.

4. The greenhouse of claim 1, further comprising at least one electricity-generating turbine disposed within the outlet tower.

5. The greenhouse of claim 1, further comprising a heat sink beneath the floor surface, the heat sink in operation configured to perform at least one of absorbing heat into the floor surface from at least the air within the air passage, and releasing the absorbed heat into the air passage from the floor surface.

6. The greenhouse of claim 1, further comprising a heat exchanger in fluid communication with the air exiting the greenhouse via the air outlet, the heat exchanger in operation transferring heat from said air to another fluid.

7. The greenhouse of claim 1, wherein the air outlet of the outer layer comprises at least one air feed conduit disposed on the outer layer, the at least one air feed conduit having a feed inlet to receive air from outside the greenhouse, and a feed outlet disposed within the air passage.

8. The greenhouse of claim 1, further comprising a plurality of planar plant supports being spaced apart vertically from the floor surface within the enclosure.

9. The greenhouse of claim 8, further comprising a plurality of upright cultivation towers disposed within the enclosure, each cultivation tower being disposed on one of the plant supports.

10. The greenhouse of claim 8, further comprising a plurality of cultivation bins disposed within the enclosure, each cultivation bin being disposed on one of the plant supports.

11. The greenhouse of claim 1, further comprising a geopolymer concrete base, the floor surface being disposed on the base.

12. The greenhouse of claim 1, wherein the inner and outer layers are made from a light-transparent material selected from the group of Poly(methyl methacrylates) (PMMAs).

13. The greenhouse of claim 1, wherein the inner and outer layers and the floor accommodate a multi-floor structure.

14. A greenhouse, comprising:
- a double shell geometry defined by an inner light-transparent shell forming an air-tight lower enclosure with a floor for plant cultivation that is not connected to outside air, and an outer light-transparent shell separated from the inner shell by an air gap;
- both the shells having the same shape, both the shells being impermeable to air and defining an air passage where air is constrained between the inner and outer shells, the air passage being in fluid communication with at least one bottom air inlet at a lower portion of the outer shell and with at least one upper air outlet, the air passage being unobstructed between the at least one bottom air inlet and the at least one upper air outlet to form an upward flow of air within the air passage from the at least one bottom air inlet to the upper air outlet, the upward flow resulting from convection when the air within the air passage is being heated, the upward flow transporting heated air to the upper air outlet; and
- an outlet tower mounted to a top portion of the outer shell and extending upwardly from an opening in an apex of the outer shell to an outlet passage, the outlet tower having an hourglass shape and a curved airfoil surface, and an inlet guide vane spaced inwardly from the curved airfoil surface to define a secondary gap therebetween, the secondary gap being in fluid communication with a secondary air inlet to provide air into the secondary gap.

15. The greenhouse of claim 14, wherein air in the air passage constrained between the inner and outer shells forms a passive heat conservation mechanism.

16. The greenhouse of claim 15, wherein the double shell geometry and floor are integrated with an multi-floor building.

* * * * *